United States Patent Office 3,080,763
Patented Mar. 12, 1963

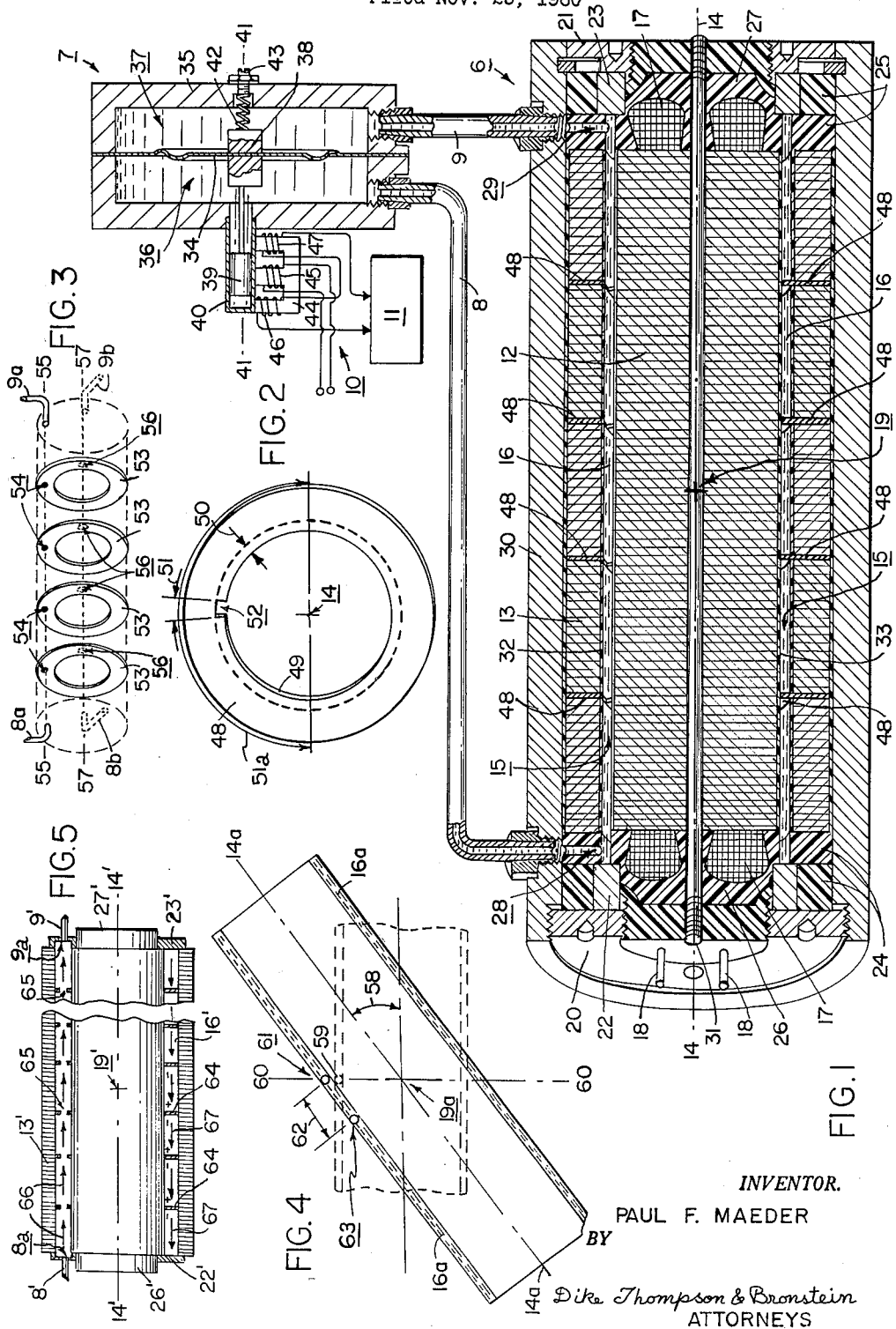

3,080,763
GYROSCOPE DEVICE
Paul F. Maeder, Rumford, R.I., assignor, by mesne assignments, to Speidel Industrial Division, Inc., Warwick, R.I., a corporation of Delaware
Filed Nov. 23, 1960, Ser. No. 71,304
9 Claims. (Cl. 74—5.7)

The present invention relates to inertial devices and, in one particular aspect, to gyroscopes of the type having electromagnetically-driven liquid rotors wherein hydrodynamic characteristics and output pressure-signal sensitivity are significantly improved through suppression of spurious flows.

In conventional form, gyroscopes have included a relatively massive and precisely-balanced rotor which is mounted in a balanced gimbal and is rotated at high speed about a spin axis by electric or pneumatic motive equipment, the rotor in turn being suspended in a frame or further gimbal for relative movement about at least one further axis normal to the spin axis. Optimum performance is approached only through costly design and manufacture which are intended to minimize static weight, to reduce troublesome bearing frictions, and to compensate for static and dynamic imbalance, windage, and temperature-induced dimensional variations. A unique gyroscope construction which materially reduces or entirely avoids difficulties of such origins instead involves a confined conductive liquid as the sole rotating component, the liquid rotation which develops desired inertial characteristics being imparted by static electromagnetic structure. The pressure differences which are developed longitudinally across an annulus of mercury rotated in such a manner are conveniently exploited for purposes of measurement of the rates of turn experienced about a sensing axis normal to the spin axis. However, it is found that if the axial length of the annulus is increased, with the object of magnifying the pressure differential and resultant output signals, or if the overall size and mass are sought to be reduced by the most obvious expedient of decreasing the annulus diameter, the pressure differences instead tend to decrease and the output signals are deteriorated rather than improved. According to the present invention, this characteristic is recognized as primarily the result of certain spurious flow phenomena within the liquid annulus as movements of the enclosure take place about the sensing axes, and it is discovered that there is a restricted range for the ratios of annulus diameter to length, outside of which the gyroscope sensitivity can either, on the one hand, be seriously impaired or, on the other hand, be insufficiently improved to balance the attendant increased cost and bulk of the gyroscope. Increased sensitivity of output and/or miniaturizattion are nevertheless effectuated, according to a unique concept of baffling which suppresses the excessive flow in unwanted directions and yet obeys the restrictions upon annulus dimensions and selectively couples internal pressures to measurement equipment without attenuation.

It is one of the objects of the present invention, therefore, to provide improved gyroscopic apparatus having conductive liquid rotors in which pressure differentials characterizing rates of turn are increased.

A further object is to provide a magnetohydrodynamic gyroscope of improved sensitivity which is of uncomplicated and low-cost manufacture and operates satisfactorily in miniaturized forms.

Another object is to provide simple and accurate liquid-rotor gyroscopic apparatus wherein measurement of inertial effects is significantly improved by electrically-conductive baffling which suppresses excessive flow of the liquid in unwanted directions while adding pressures occurring along a selected measurement path.

By way of a summary account of practice of this invention in one of its aspects, I provide an electromagnetic stator assembly having concentric elongated magnetic core members separated by a thin radial gap through which an apparently-rotating radial magnetic field is produced by a distributed polyphase A.-C. electrical winding array associated with one of the core members. A plurality of spaced thin electrically-conductive baffle plates, each having at least a small opening transversely therethrough, tend to effect a separation of the elongated gap between the core members into a plurality of annular gaps of about equal axial lengths, which lengths are also about the same as their mean diameters. Electrically conductive end closures for the gap in the assembly are each provided with an opening angularly aligned with the openings in all of the baffle plates about the central axis of the concentric core members, and the annular gaps are filled with mercury. Interactions between the magnetic flux of the stator assembly and the magnetic flux attending induced eddy currents in the mercury develop motor torques which spin the mercury about the central longitudinal axis of the assembly at speeds which occasion inertial tendencies of the mercury to remain spinning about that same axis whenever the supporting assembly is turned about another axis. Instantaneous hydrodynamic pressures appearing in the aligned openings in the end closures are communicated to opposite sides of a neutrally-suspended diaphragm of a differential pressure sensor, by mercury-filled conduits, and the diaphragm displacements are translated into electrical output signals characterizing the angular velocities of movements experienced by the gyro structure about a measurement axis.

Although the features of this invention which are believed to be novel are set forth in the appended claims, the details of preferred embodiments of the invention and the further objects and advantages thereof may be readily comprehended through reference to the following description taken in connection with the accompanying drawings, wherein:

FIGURE 1 illustrates an improved hydrodynamic gyroscope assembly and associated differential pressure sensor and electrical translater, the gyroscope and pressure sensor being viewed in cross section;

FIGURE 2 depicts an apertured annular baffle plate employed in the gyroscope assembly of FIGURE 1;

FIGURE 3 portrays an array of apertured flow-baffling partitions associated with pressure-sensor conduits;

FIGURE 4 is a schematic diagram illustrating the origins of unwanted secondary flow effects within a liquid-rotor gyroscope; and FIGURE 5 represents the electromagnetic and liquid-confining structure of an improved gyroscope unit, together with symbols characterizing instantaneous hydrodynamic pressures.

Having reference to the embodying equipment illustrated in FIGURE 1, it will be perceived that this includes a gyroscope assembly 6, a pressure sensor 7, interconnecting conduits 8 and 9, an electrical detector 10 in the form of a differential transformer, and a signal utilization device 11 represented in block form. Assembly 6 includes inner and outer stacks of laminations of magnetic material, designated by reference characters 12 and 13, respectively, which are concentric about a central longitudinal axis 14—14 and which are radially separated by an annular gap 15. For the purpose of developing important motive effects with the liquid mercury 16 filling gap 15, the cylindrical inner lamination stack 12 cooperates with polyphase electrical windings distributed in the manner of conventional alternating current motor stator windings and exhibiting end turns 17 in the cross-sectioned view. These windings are excited by way of insulated electrical coupling connections 18, and the resulting alternating magnetic flux developed by the excited windings selects preferred low-reluctance flow paths including the material of both the inner and outer lamination stacks 12 and 13 and thereby traverses the annular gap 15 in substantially radial directions. Suitable alternating current electrical excitation of the needed different phases may be derived from a polyphase source or through known phase-splitting circuitry. In a known form of alternative stator construction, the distributed electrical windings may be associated with the outer annular lamination stack 13, rather than with the inner cylindrical lamination stack 12, with like results. Preferably, the dense electrically conductive liquid rotor annulus 16 is mercury, which is conveniently molten in the wide temperature range from −38.8° C. to +356.7° C., and eddy currents are induced within it by the applied radial magnetic flux field. In turn, the induced currents establish magnetic fields which interact with the applied fields to produce net torques upon the liquid annulus in one angular direction about the longitudinal spin axis 14—14. The resulting rotation of the mercury involves inertial tendencies for each unit volume thereof to rotate only in a plane normal to the spin axis, and to remain in such a plane of rotation despite transient angular movements of the confining structure about axes normal to the spin axis. Therefore, upon such angular movement of the confining structure, the spinning liquid develops hydrodynamic pressures at various positions which are different from those pressures appearing at the same positions under static conditions of the confining structure. Depending upon appropriate selection of positions for measurements responsive to the different pressures, the sense and magnitude of the angular velocity of movements of the structure about a transverse axis, such as 19, are measurable.

In gyroscope unit 6, these measurement positions are located near opposite axial ends of the mercury annulus, the two liquid-filled conduits 8 and 9 there being tapped into the annulus in angular alignment about the spin axis 14—14 for this purpose. The mercury annulus extends slightly beyond the axial extremities of the lamination stacks and into the end closure assemblies which each include one of the end plates 20 and 21, annular end conductors 22 and 23, spacer elements 24 and 25, and cast resin encapsulations 26 and 27 for the winding end turns 17. Bores 28 and 29 tap the conduits 8 and 9 into the annulus through the outer cylindrical casing 30 and the spacer elements 24 and 25. Central longitudinal stud 31 serves to stake the elements of the assembly together in the desired enclosing and concentric relationships. Both the inner periphery of the outer annular lamination stack 13 and the outer periphery of the inner cylindrical lamination stack 12 are smoothly sheathed at 32 and 33, respectively, by a layer of protective plastic encapsulating material such as an epoxy resin, which insures that the enclosed mercury will not react with or leak between the laminations and will rotate with low losses at these surfaces. End conductors 22 and 23 are seen to be in electrical contact with the mercury annulus at its two axial extremities, whereby these conductors promote circulation of the induced currents through paths which improve the net torques experienced by the mercury.

Differential pressure unit 7 illustrates one convenient means for sensing instantaneous differential pressures occurring across the sites of the axially-displaced and angularly-aligned measurement bores 28 and 29 as turns are experienced about the sensing axis 19, which is perpendicular to the plane of the figure. Although hydrodynamic pressures in the immediate vicinity of these bores remain substantially equal under conditions when there is no angular movement of the gyroscope unit about axis 19 normal to the spin axis 14—14, significant differences between these pressures are developed as the result of such angular movement, because of the tendency for the spinning mercury annulus to preserve its rotation about an axis fixed in space while the supporting structure is angularly displaced in relation to it. If, for example, the displacement of the gyro structure is in the clockwise direction about axis 19, the pressure in the vicinity of bore 28 will increase and that in the vicinity of bore 29 will decrease. Angular movement in the opposite, counterclockwise direction reverses the effects, such that pressures near bore 29 are increased in relation to those near bore 28. In each instance, the rate of turn experienced instantaneously will govern the magnitude of the differential pressure between these measurement positions, and the differential pressure sensor 7 is thus enabled to characterize not only the sense but the magnitude of the rates of turns. For these purposes, the sensor 7 is equipped with a thin movable flexible diaphragm or membrane member 34 separating the housing 35 into two compartments, 36 and 37, each of which is filled with mercury and is in communication with a different one of the pressure measurement sites by way of a different one of the mercury-filled conduits 8 and 9. Movable member 34 is fixed with a central element 38 which is in driving relationship to a movable armature 39 and slides that armature within a sealed non-magnetic tube 40 along axis 41—41 in response to differences in pressures appearing between compartments 36 and 37. Spring element 42, adjustable through manipulation of adjusting screw 43, assists in biasing the diaphragm and its movable attachments to an important null or neutral position along the axis 41—41, although it will be understood that the member 34 alone may serve to orient the parts to the null position in a modified construction. The movable assembly is arranged to be substantially neutrally suspended in the mercury which fills the sensor, that is, its mass is substantially equal to that of the liquid which it displaces, and the movable assembly thus cannot become erroneously deflected in response to environmental accelerations other than those which result in the measured pressure differences in the gyro unit. Armature 39, which is constructed of magnetic material, is slidable in relation to the three legs of an E-shaped core 44 of a differential transformer positioned on the exterior of the non-magnetic tube 40. In the illustrated null position, armature 39 occupies a central symmetrical location in relation to the core legs and causes alternating magnetic flux originating with the electrically energized center-leg winding 45 to divide equally between the outer legs and, thereby to induce equal and opposite voltage in the serially-connected output windings 46 and 47. Increase in the pressure of compartment 37 over that of compartment 36 develops a displacement of membrane 34 and armature 39 to the left, whereby a greater amount of A.-C. magnetic flux is shunted through winding 46 and a lessened amount through winding 47, with the result that the net signal appearing at the input to the signal utilization device is of a magnitude and is of one of two opposite phases which will characterize the rate of turn counterclockwise about sensing axis 19. The effects are similar, though reversed, for turns in the clockwise direction, and device 11 may then respond to the outputs to provide related control or indication, in a known manner. Hydrostatically, the measurement path including the conduits 8 and 9 and the sensor 7 with its neutrally-suspended movable assembly comprises a fully closed loop in association with the annulus, which loop is in continuous equilibrium insofar as spurious external accelerations are concerned. Pressure head at any point is advantageously counterbalanced in the two directions about the loop, except as the rotating annulus develops the wanted pressure differences related to turns about the sensing axis 19. Other accelerations cannot cause measurement error, and the gyro may be operated in any attitude relative to accelerations of gravity or of the flight of a craft.

The radial gap of the liquid-filled annular space 15 is kept very htin, to permit intense radial magnetic flux field to be generated through it by the electromagnetic motor windings, although it is of course sufficiently thick to avoid disproportionate losses in the liquid rotor due to viscous shear and surface phenomena. It has also been found that the diameter and length of the rotating mercury annulus are in important relationships to the pressure signal, and that the pressure differences exhibited in the aforesaid fashion are related to these dimensional parameters substantially as follows:

$$\eta_\text{D} = \frac{d}{L} \tanh \frac{L}{d}$$

where
$\eta_\text{D}$ = pressure signal,
$d$ = diameter of liquid annulus at which pressure is sensed, and
$L$ = axial length of liquid annulus.

From this expression, it may be observed that the pressure signal is very sharply decreased as the diameter is made shorter than the axial length of the liquid annulus, with a diameter-to-length ratio of 1:2 yielding a pressure output of only about one-half the theoretical maximum. Moreover, an increase in this ratio beyond about 2:1 does not occasion a significant increase in the pressure signal. This characteristic seemingly imposes a severe limitation upon gyroscope designs which either would develop magnified and more sensitive outputs or would miniaturize the gyro size and weight without unduly sacrificing output. By way of example, an annulus having a 1:4 diameter-to-length ratio such as that of the FIGURE 1 gyrocsope could be expected to develop a pressure signal only about one-fourth the theoretical maximum. The limitation is believed to originate in rather complex secondary flow phenomena, which are to be distinguished from the primary liquid flow in the direction of its rotation in the annulus. This may be understood by recognizing that, although the liquid tends to remain spinning about a given axis in space as its supporting enclosure is moved, the enclosure nevertheless opposes this tendency and forces the liquid to alter its rotational flow pattern to adjust itself to the new orientation of the enclosure. The result of the secondary flow which occurs as this alteration takes place is a severe lessening of the sensed differential pressures from what they would otherwise be. However, one does not find a fully satisfactory solution to this difficulty in merely shortening the axial length of the gyrochope to within the optimum range of diameter-to-length ratios from about 1:2 to 2:1, because it is important that instruments of this character also be improved so that they may develop the highest possible magnitudes and sensitives of outputs.

Electrically-conductive and non-magnetic baffles or partitions 48 overcome the aforesaid difficulties and limitations in a unique manner. Each of them is conveniently in the form of a thin substantially annular washer, as depicted in FIGURE 2, which permits it to be interleaved within the outer lamination stack 13, and, thereby, to be supported such that its inner peripheral edge 49 contacts and becomes substantially sealed with the outer periphery of the cylindrical inner lamination stack 12. In this connection, baffles 48 are radially wider than the outer annular laminations by an amount 50, which is also about the same as the radial gap width in the gyroscope, such that the baffles may close the gyro gap along all but one arcuate span 51. At that arcuate site there is provided a transverse aperture 52, which, in a preferred simple form, is a slot. Four such baffles interrupt the liquid annulus of gyro unit 6, to produce a total of five chambers which are partly isolated from one another and are partly intercoupled by way of the apertures 52, the apertures being substantially aligned with one another and with the two pressure-tapping bores 28 and 29 angularly about the spin axis 14—14. The angle 51 of the arc of slots 52 may be below about 10 degrees in some constructions, to prevent the occurrence of substantially all secondary flow between the adjoining compartments while at the same time permitting needed pressures and minute resultant flow of liquids to be communicated between the compartments for measurement purposes. In other constructions, where speed of response in measurement is particularly important and where a relatively minor reduction in sensitivity may be tolerated for improvement of such response, the arcuate expanse of slot 52 may be significantly increased, the 180 degree angle 51a in FIGURE 2 being illustrative in this respect. In the illustration of another array of baffles, 53, in FIGURE 3, a serial angularly-aligned row of small circular apertures 54 appear along the axis 55—55 together with the ends of measurement conduits 8a and 9a, which are comparable to pressure conduits 8 and 9 respectively of the gyroscope assembly of FIGURE 1. A row of similar apertures 56, angularly displaced 90 degrees from apertures 54, and disposed along an axis 57—57 together with ends of measurement conduits 8b and 9b would serve to aid measurement of turns about a transverse sensing axis perpendicular to that for which the measurement conduits 8a and 9a are effective.

The baffles are in each instance fabricated of an electrically conductive material, such as copper, which is readily wetted by liquid mercury. Electrical conductivity of the liquid annulus is thus uninterrupted along its length, this being important to promote the circulation of induced eddy currents in paths through the external bus bars 22 and 23 and, thereby, to improved the liquid-accelerating torques in the gyroscope The baffles are in any event non-magnetic, such that they will not magnetically bridge the radial gap between the lamination stacks and seriously weaken the flux field across the gap and through the liquid. While it is apparent that the aforementioned secondary flow of liquid must take place at least to some extent within a liquid annulus, even though its axial length be limited to within the optimum range, it is found nevertheless that the desired inertial effects of the spinning fluid are dominant and that the secondary flow does not intolerably decrease the pressure signals available for measurement provided the diameter-to-length ratios are within the noted range. Taking advantage of this, annular baffles 48 in the gyro unit 6 operate to bring the effective diameter-to-length ratio in that unit to within the desired range, the five compartments each having a diameter-to-length ratio of about 1.3:1 rather than about 1:4 as in the case of the same unit without the baffles. This is not the equivalent of merely reducing the total length of the gyro unit, however, because the five compartments are also intercoupled via the aligned slots to exhibit a much greater cumulative pressure signal substantially equal to the sum of the pressure signals of each. Although the slots or other apertures must necessarily permit some of the fluid to flow between compartments as the result of the secondary flow tendencies, it is found, advantageously, that the aperture angle may be opened to about 180 degrees with only about a 25% decrease in sensitivity of the gyro. A greater or lesser number of baffles than the four illustrated may be introduced in a gyro unit such as that of FIGURE 1, of course, having due regard for the facts that the pressure signal drops off at a high rate when the diameter-to-length ratio of the annulus in each compartment is less than about 1:2 and that the pressure signal is not significantly improved when this ratio exceeds about 2:1. In the latter connection, the use of a greater number of baffles than is needed is undesirable in that it will increase cost of construction and will also impair the gyro efficiency due to such factors as electrical losses in the baffles, pressure drops through the baffles, and losses resulting from the surface phenomena arising between the stationary baffle surfaces and the rotating liquid.

The origins of the disturbing secondary flow are suggested by the schematic illustration of FIGURE 4 wherein an elongated spinning liquid annulus 16a is shown in cross-section at an instant when its spin axis 14a—14a has just been displaced counter-clockwise about the sensing axis 19a by an angular amount 58 from its immediately prior orientation shown in dashed linework. A small unit volume of liquid, 59, which had been rotating in the plane of axis 60—60, normal to the spin axis, tends to remain in that same plane when the annulus is displaced by the angular amount 58, such that it occupies the position 61 in the full-line ilustration. For this to have occurred, the unit volume of liquid must have been displaced axially by the amount 62 from the initial relative position 63, which represents a flow in relation to the supporting enclosure (not there shown). At the diametrically opposite position, the comparable flow is in the opposite axial direction, and such flow relative to the enclosure is out of correspondence with the direction of flow due to spinning of the liquid. The axial ends of the annulus are fixed by the enclosure and will not yield to accommodate such relative axial motion between the liquid and its enclosure, such that the liquid must concurrently be coerced to flow in paths around the annulus itself to complete the flow loops including the aforesaid flows in the different axial directions at the diametrically opposite positions. The spurious nature of the secondary flow itself suggests the probability that the intelligence conveyed by the pressure signals measured at the axial extremities would be impaired; this proves to be the case, as has been described, with the deterioration becoming more pronounced and critical as the axial length of the annulus is increased.

Hydrodynamic pressure characteristics of the specially compartmentalized gyroscope are indicated in the simplified illustration of a gyro unit in FIGURE 5, wherein the reference characters having single-prime accents represent features corresponding to those of the same number in the FIGURE 1 apparatus. A plurality of electrically conductive annular baffles 64 each have an aperture 65 of at least the same cross-sectional area as the interiors of pressure-sensing conduits 8' and 9', and as much as 180 or 270 degrees if speed of response must be as high as possible, the apertures and the tapping by the conduits being substantially in angular alignment about the spin axis 14'—14'. Under the condition of instantaneous counterclockwise angular movement of the gyroscope structure about sensing axis 19', the axial pressures along the upper and lower parts of the mercury-filled gap are in the opposite directions indicated by arrows 66 and 67 respectively, and are of substantially the same magnitude in each compartment. The baffles 64 are of sufficient mechanical strength to isolate from one another the pressures in the adjoining compartments, except where the apertures 65 are in communication with one another. There, the pressures are additive, and the pressure-sensing conduits respond to the differential pressures fully across the gyro unit. The illustrated conditions are reversed for turns in the opposite angular direction, of course, and the pressures are of magnitudes dependent upon the rates of turn experienced. Preferably, the small pressure-sensing conduits are tapped with the spinning mercury by way of relatively quiescent pools of mercury 8a and 9a which result from the illustrated recessing of the bus bars 22' and 23' for a short angular distance about axis 14'—14'. The small-area ends of the conduits are thus not directly confronted by rapidly-spinning mercury which would tend to disturb transmission of the differential pressures through them and would therefore tend to reduce measurement sensitivity. This construction advantageously permits the efficient use of small conduits, with only a small quantity of mercury in the external measurement loop.

As has been noted earlier herein, the size of aperture which is permitted to exist between the adjacent compartments bears an important relationship to speed of measurement response. A partition in the form of an annular sector having an arc of as little as 90 degrees for this purpose, nevertheless produces a pronounced improvement in the suppression of secondary flow, and hence, in sensitivity. Partitions extending only about half way around the annulus suppress the secondary flow very materially, with the gyro sensitivity being reduced only about 25% from the theoretical maximum while speed of response is significantly improved as compared with the responses of gyros having partitions opened only a few degrees. The highly damped response occurring with use of small apertures in the partitions is believed to have its basis in the momentum of the spinning fluid in each compartment. A definite quantity of such fluid, spinning angularly, must nevertheless flow axially to occasion a measurement by the external pressure sensor, and when the partition aperture areas are small the differential pressures across each compartment must be large and sustained to overcome the rotating inertia of the fluid and cause the needed quantity of axial flow to take place quickly. However, as the partition aperture area is increased, the same differential pressure effective over the larger area moves a greater quantity of the fluid out of each compartment and into the next and into one of the measurement conduits within a short period, for optimum performance, the small-arc partitions are well displaced, angularly, from the longitudinal path across which the pressure-sensing conduits tap the gyro output.

The motive means and detecting and translating means selected for purposes of illustration may be of different form in alternative constructions. By way of example, another source of motive power for rotation of the conductive liquid rotor may involve an external source driving electrical current axially along the liquid annulus, through the conductive bus bars at the axial extremities, such that the magnetic fields from these currents may interact with radial magnetic fields from the stator structure to produce desired rotational torques in accordance with known principles. Pressure-responsive sensors may likewise be of construction differing from that shown in the drawings, such as a generally similar sensor including a neutrally balanced movable piston rather than a movable diaphragm or membrane. The movable elements of such sensors may also act to open and close electrical switching contacts, one of which contacts may comprise the conductive liquid itself, another contact being insulated from or electrically connected with the conductive liquid according to the positioning of the movable element, in a known manner. Electrical output signals developed by the electrical translating equipment may of course be applied to a simple electrical indicating or recording instrument, or to the input of automatic pilot amplifiers or the like, whichever is selected to function as the signal utilization device.

It should be understood that the specific embodiments of this invention disclosed herein are of a descriptive rather than a limiting character and that various changes, combinations, substitutions, or modifications may be employed in accordance with these teachings without departing in spirit or scope from this invention in its broader aspects.

What I claim as new and desire to secure by Letters Patent of the United States is:

1. Apparatus responsive to angular movement comprising a structure having a substantially annular hollow and liquid-tight chamber therein, at least one substantially planar partitioning member supported by said structure substantially normally to the central longitudinal axis of said annular chamber and radially through said chamber to separate said chamber into adjacent liquid-tight annular compartments, said partitioning members in part closing said annular chamber and in part being open to exhibit a communicating opening therethrough between the adjacent compartments, electrically conductive liquid filling said compartments, electrical motive means producing liquid-accelerating torques rotating said liquid in each of said compartments about said axis, sensing means responsive to differences in the liquid pressures within said chamber axially along an axial path angularly aligned with said opening through said partitioning member about said axis, and means translating the responses of said sensing means into output signals characterizing angular movements of said structure about a sensing axis normal to said central axis and displaced substantially 90 degrees from said axial path angularly about said axis.

2. Apparatus responsive to angular movement comprising a structure having a substantially annular hollow and liquid-tight chamber therein, a plurality of substantially planar partitioning members supported by said structure in spaced parallel relationship normal to the central longitudinal axis of said annular chamber and radially through said annular chamber to separate said chamber into a plurality of adjacent liquid-tight annular compartments, said partitioning members each in part closing said annular chamber and in part being open to exhibit a communicating opening therethrough between adjacent compartments, the communicating openings of said partitioning members being substantially in angular alignment about said axis, electrically conductive liquid filling said compartments, electrical motive means producing liquid-accelerating torques rotating said liquid in each of said compartments about said axis, sensing means responsive to differences in the liquid pressures within said chamber axially along an axial path angularly aligned with said openings through said partitioning members, and means translating the responses of said sensing means into output signals characterizing angular movements of said structure about a sensing axis normal to said central axis and displaced substantially 90 degrees from said axial path angularly about said axis.

3. Apparatus responsive to angular movement comprising a structure forming a liquid-tight enclosure having a hollow annular chamber therein and forming at least one substantially planar partition separating said chamber into adjacent collinear annular compartments, said partition being opened arcuately about the central longitudinal axis of said chamber to exhibit a communicating opening between said compartments, electrically conductive liquid filling said compartments, electrical motive means producing liquid-accelerating torques rotating said liquid in each of said compartments about said axis, pressure-sensing means responsive to differences between the pressures at opposite axial ends of said annular chamber at positions in angular alignment with said opening through said partition about said axis, and means translating the responses of said sensing means into output signals characterizing angular movements of said structure about a sensing axis normal to said central axis.

4. Apparatus responsive to angular movement comprising a structure forming a liquid-tight enclosure having a hollow annular chamber therein and forming at least one substantially annular electrically-conductive partition separating said chamber into adjacent collinear annular compartments, said partition being opened arcuately about the central longitudinal axis of said chamber to exhibit a communicating opening between said compartments, said annular compartments each having a ratio of diameter to axial length greater than about one-half, electrically conductive liquid filling said compartments, electrical motive means producing liquid-accelerating torques rotating said liquid in each of said compartments about said axis, sensing means responsive to differences in the liquid pressures within said chamber axially along a path angularly aligned with said opening through said partition about said axis, and means translating the responses of said sensing means into output signals characterizing angular movements of said structure about a sensing axis normal to said central axis.

5. Apparatus responsive to angular movement as set forth in claim 4 wherein said annular chamber has a ratio of diameter to axial length less than about one-half, and wherein the ratio of diameter to axial length of each of said annular compartments is not in excess of about two.

6. Apparatus responsive to angular movement comprising a structure forming a liquid-tight and hollow annular chamber therein and forming at least one annular electrically-conductive substantially planar partition separating said chamber into adjacent collinear annular compartments with an opening therebetween, said partition extending arcuately for about at least 90 degrees and less than 360 degrees about the central longitudinal axis of said chamber, said structure including an annular core of magnetic material and a substantially coextensive substantially cylindrical inner core of magnetic material disposed coaxially outside and inside, respectively, of said annular compartments, electrically conductive liquid filling said compartments, a pair of electrically-conductive busses disposed one at each axial end of said annular chamber in electrical contact with said liquid, electromagnetic winding means excited with alternating current and directing apparently-rotating alternating magnetic flux substantially radially between said cores, said magnetic flux generating eddy currents within said liquid and directed by said busses and partition through said liquid in directions to develop net torques rotating said liquid in one angular direction within said annular chamber, sensing means responsive to differences in the liquid pressures within said chamber axially along a path aligned with said opening between said compartments, and means translating the responses of said sensing means into output signals characterizing angular movements of said structure about a sensing axis normal to said central axis.

7. Apparatus responsive to angular movement comprising a structure forming a liquid-tight enclosure having a hollow annular chamber therein and forming at least one electrically-conductive substantially planar partition separating said chamber into adjacent collinear annular compartments, said partition being opened arcuately about the central longitudinal axis of said chamber to exhibit a communicating opening between said compartments, said annular chamber having a ratio of diameter to axial length less than about one-half, and each of said compartments having a ratio of diameter to axial length which is greater than about one-half and not in excess of about two, liquid mercury filling said compartments, a pair of electrically-conductive busses disposed one at each axial end of said annular chamber in electrical contact with said liquid mercury, electrical motive means producing liquid-accelerating torques rotating said liquid in each of said compartments about said axis, sensing means responsive to differences in the liquid pressures within said chamber axially along an axial path angularly aligned with said opening through said partition about said axis, and means translating the responses of said sensing means into output signals characterizing angular movements of said structure about a sensing axis normal to said central axis and displaced substantially 90 degrees from said axial path angularly about said axis.

8. Apparatus responsive to angular movements comprising a structure forming a liquid-tight and axially elongated hollow annular chamber therein having a ratio of diameter to axial length less than about one-half, a plurality of thin electrically-conductive partitions fixed with said structure in spaced parallel relationship normal to the central longitudinal axis of said chamber and each having an opening transversely therethrough within said annular chamber and extending arcuately about said axis, the openings through said partitions being angularly aligned about said axis, said partitions separating said chamber into a plurality of adjacent liquid-tight compartments which are in liquid communication with one another only through said openings and which each have a ratio of diameter to axial length greater than about one-half, said structure including an annular core of magnetic material and a substantially coextensive substantially cylindrical inner core of magnetic material disposed coaxially outside and inside, respectively, of said annular chamber and axially encompassing all of said adjacent annular compartments, liquid mercury filling said compartments, a pair of electrically-conductive busses disposed one at each axial end of said annular chamber in electrical contact with said liquid mercury therein, electromagnetic winding means mounted with one of said cores and excited by alternating current to direct magnetic flux radially between said coaxial cores, said magnetic flux generating eddy curents within said liquid and directed by said busses and partitions through said liquid in directions to develop net torques rotating said liquid in one angular direction within each of said annular compartments, sensing means responsive to differences in the mercury pressures at substantially the opposite axial ends of said chamber and in alignment with the openings in said partitions angularly about said axis, and means translating the responses of said sensing means into output signals characterizing angular movements of said structure about a sensing axis normal to said central axis.

9. Apparatus responsive to angular movement as set forth in claim 8 wherein said sensing means comprises a differential pressure sensor having a movable means therein separating two compartments therein, hollow conduit means coupling each of said sensor compartments with said chamber at substantially said opposite axial ends thereof, said sensor compartments and conduits being filled with liquid mercury, and said movable means being substantially neutrally suspended within said mercury in said sensor compartments, and wherein said translating means is coupled with said movable means in said sensor for translating movements thereof into said output signals.

References Cited in the file of this patent
UNITED STATES PATENTS

| | | |
|---|---|---|
| 2,099,593 | Bender et al. | Nov. 16, 1937 |
| 2,716,943 | Vandenberg | Sept. 6, 1955 |
| 2,949,784 | Maeder | Aug. 23, 1960 |